UNITED STATES PATENT OFFICE.

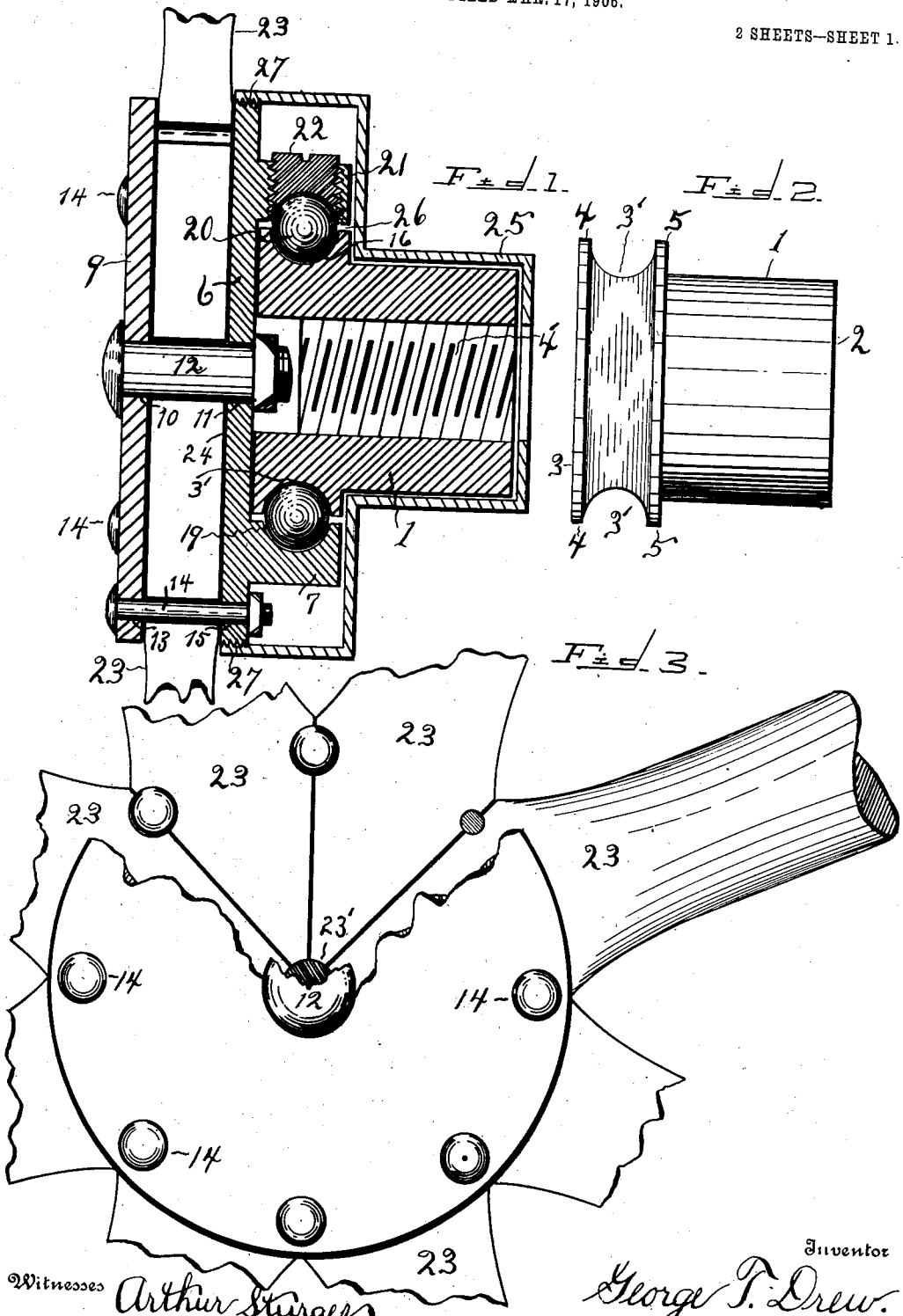

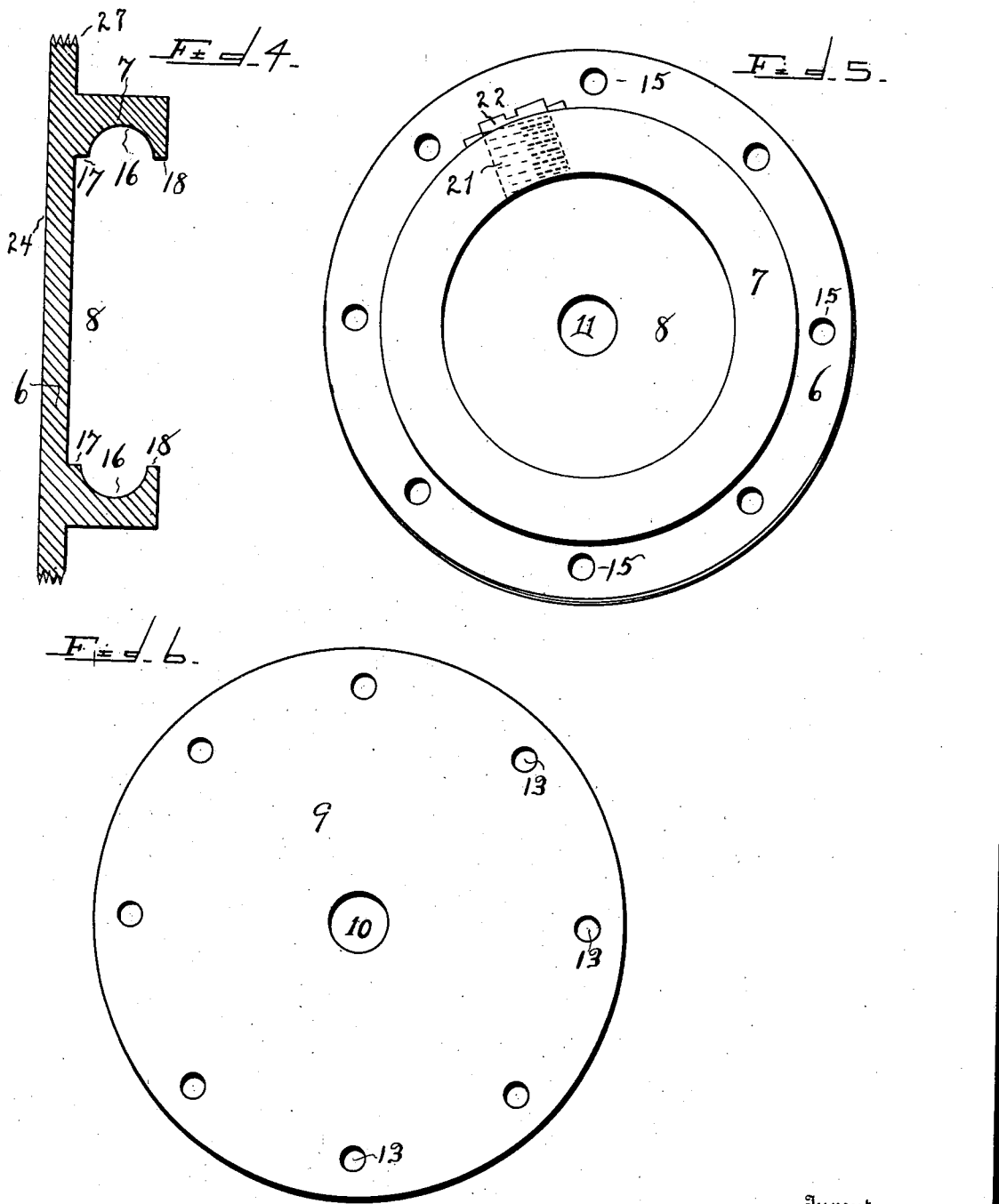

GEORGE T. DREW, OF OMAHA, NEBRASKA.

VEHICLE-WHEEL.

No. 826,093.  Specification of Letters Patent.  Patented July 17, 1906.

Application filed March 17, 1906. Serial No. 306,520.

*To all whom it may concern:*

Be it known that I, GEORGE T. DREW, a citizen of the United States, residing at Omaha, in the county of Douglas and State of Nebraska, have invented certain new and useful Improvements in Vehicle-Wheels, of which the following is a specification.

My invention relates to improvements in vehicle-wheels, and has reference particularly to the manner of mounting wheel-spokes.

The invention has for its objects the provision of a more extensive space for the housing of wheel-spokes than heretofore presented and a construction which will permit a ready removal of a defective spoke without dismembering the wheel, also to provide a hub having a less outward projection than heretofore presented, so that it may not be obtrusive.

The invention also presents a construction by which the objectionable "gather" of the wheel is avoided and by which larger anti-friction-balls are used than formerly.

The novel devices employed are fully described herein and are illustrated by the drawings, wherein—

Figure 1 represents a vertical elevation of the invention, the parts being generally in section. Fig. 2 represents a vertical elevation of the cylinder 1. Fig. 3 represents an end view of the invention, showing manner of mounting the spokes. Fig. 4 represents a sectional view of disk 6 and sleeve 7. Fig. 5 is an end view of Fig. 4. Fig. 6 represents a vertical elevation of the socket-plate.

I construct a cylinder 1, having vertical end walls 2 and 3, and a lengthwise opening 4' therethrough, and upon the periphery of the cylinder, near one end thereof, I construct the continuous groove 3', having the walls 4 and 5. I construct the disk 6, having the outer wall 24 and having a greater diameter than cylinder 1, and near its periphery construct integrally thereon the circular sleeve 7, thereby forming the chamber 8, and the disk is provided with the small openings 15. I provide the socket-plate 9 of a diameter similar to that of disk 6 with a small opening 10 at its center. Disk 6 is also provided with a small central opening 11, and these apertures are adapted to receive the bolt 12 therethrough, and I provide a series of apertures 13 near the outer edge of socket-plate 9, corresponding to the openings 15 of disk 6, these openings 13 and 15 being adapted to receive a series of bolts 14 therethrough.

The inner circular wall of sleeve 7 is provided with a circular groove 16, having the walls 17 and 18. The diameter of that part of the cylinder 1 at walls 4 and 5 is somewhat less radially considered than the space occupied by chamber 8, and I place cylinder 1 within this chamber in a manner so that walls 4 and 5 are opposite walls 17 and 18, respectively, the grooves 3' and 16 coöperating to form a circular opening 19, within which the balls 20 are adapted to be seated.

The disk 6 and sleeve 7 are preferably formed as one casting, and I provide the aperture 21 in a radial direction through the sleeve sufficiently wide to allow the passage therethrough of the balls 20 and provide the plug 22, having thread-and-groove connection. After cylinder 1 has been placed within chamber 8 a series of balls 20 are passed through aperture 21, so that the space of the circular opening 19 is occupied by these balls in a manner so that the latter will have positions closely adjacent to each other, after which the plug 22 is screwed into position.

The inner end 23' of spokes 23 of the vehicle-wheel are radially placed and their several ends meet at bolt 12. They are positioned on a plane parallel with wall 24 of disk 6, between the last-named wall and that of the adjacent plate 9, these walls coöperating to form a housing or socket for the spokes, and these spokes are firmly held in position between these walls by means of the bolt 12 and the series of bolts 14, already described. The large opening 4' within cylinder 1 is adapted to have thread-and-groove connection with the vehicle-axle, (not shown,) this cylinder 1 being screwed upon and made rigid with the vehicle-axle.

I provide a suitable casing 25, being a cylindrical shell, its walls generally conforming to the outer walls of the disk and cylinder. This casing performs no function in holding the parts together, but it prevents dust from entering the aperture 26 between the cylinder and sleeve, and it is desirable to preserve the balls from the presence of sand or dust, as is evident. The casing makes a thread-and-groove contact at 27 upon the periphery of disk 6 and presents a neat finish closely adjacent to the spokes.

From the description thus given the function of the parts will be readily understood.

In assembling the parts the spokes are placed radially upon the vertical wall 24 of disk 6, and socket-plate 9 is then secured to disk 6 by means of the series of bolts 14 and bolt 12, thereby confining the spokes within their housing. The plug 22 being removed, cylinder 1 is placed within chamber 8. The balls are then inserted through opening 21, plug 22 is then screwed home, and casing 25 is placed in position. The wheel is then positioned upon the axle of the vehicle by screwing cylinder 1 upon the axle.

Since cylinder 1 is rigid with the vehicle-axle after being screwed thereon, it will have no motion, as is obvious; but when the wheel is revolving it will be understood, of course, that disk 6 is then in a revolving motion, carrying with it sleeve 7, socket-plate 9, the series of bolts and casing 25, and the weight of the vehicle at all times is upon the series of balls.

It will be noted that on account of the construction employed balls of large diameter may be used. The housing for the spokes is so extensive that no dishing of the spokes is required, and there is practically no hub extending or protruding beyond the outer plane of the spokes. The spokes are accessible, and a person generally unskilled may by use of simple tools readily uncouple the parts in order to remove a defective spoke. It will also be noted that the cylinder is extended in a direction transversely to the spokes. The function of this extension is to increase the surface contact of the cylinder upon the axle to add to the strength of the parts, and the degree of this extension may be greater or less, as desired. In practice I have at times dispensed with the casing 25. It operates in no manner whatever in holding the parts together; but it is a convenient dust-cover and causes a finished appearance. The parts are held together by contact of the balls with grooves 3' and 16 upon one side of the disk, and upon the opposite side of the disk the parts are held together by the bolts 12 and 14, as explained. It will also be noted that cylinder 1 may be considered one of the integral ends of a vehicle-axle, in which event the longitudinal aperture 4' in said cylinder, as well as the threads upon the inner wall of said cylinder, may be dispensed with.

Having thus described my invention, what I claim as new is—

1. A vehicle-wheel in combination, comprising a peripherally-grooved cylinder; a sleeve having a circular groove formed upon its inner wall; an inner spoke-housing plate; vehicle-wheel spokes; an outer spoke-housing plate; a part of said peripherally-grooved cylinder having a housing within said sleeve; a series of balls seated within said grooves of said cylinder and sleeve; one end of said vehicle-wheel spokes being seated between said inner and outer housing-plates; and means to form a rigid connection between said inner and outer housing-plates.

2. A vehicle-wheel in combination, comprising a peripherally-grooved cylinder having a threaded axial aperture; a sleeve having a circular groove formed upon its inner wall; an inner spoke-housing plate; vehicle-wheel spokes; an outer spoke-housing plate; a part of said peripherally-grooved cylinder having a housing within said sleeve; a series of balls seated within said grooves of said cylinder and sleeve; one end of said vehicle-wheel spokes being seated between said inner and outer housing-plates, and means to form a rigid connection between said inner and outer housing-plates.

3. A vehicle-wheel, in combination, comprising a peripherally-grooved cylinder, an apertured sleeve having a circular groove formed upon its inner wall; an inner spoke-housing plate; vehicle-wheel spokes; an outer spoke-housing plate; a part of said peripherally-grooved cylinder having a housing within said apertured sleeve; a series of balls seated within said grooves of said cylinder and apertured sleeve; one end of said vehicle-wheel spokes being seated between said inner and outer housing-plates; means to form a rigid connection between said inner and outer housing-plates, and means to make a closure of the aperture of said sleeve.

4. A vehicle-wheel, in combination; comprising a peripherally-grooved cylinder, an apertured sleeve having a circular groove formed upon its inner wall; an inner spoke-housing plate; vehicle-wheel spokes; an outer spoke-housing plate; a part of said peripherally-grooved cylinder having a housing within said apertured sleeve; a series of balls seated within said grooves of said cylinder and apertured sleeve; one end of said vehicle-wheel spokes being seated between said inner and outer housing-plates; means to form a rigid connection between said inner and outer housing-plates; means to make a closure of the aperture of said sleeve, and a casing inclosing said apertured sleeve and the periphery and end wall of said peripherally-grooved cylinder.

In testimony whereof I have affixed my signature in presence of two witnesses.

GEORGE T. DREW.

Witnesses:
Hiram A. Sturges,
William D. Rogers.